W. TIMSON.
WEIGHING SCALE.
APPLICATION FILED NOV. 15, 1920.

1,398,708.

Patented Nov. 29, 1921.
2 SHEETS—SHEET 1.

WILLIAM TIMSON
INVENTOR.
PER George T. Folkes
ATTORNEY.

W. TIMSON.
WEIGHING SCALE.
APPLICATION FILED NOV. 15, 1920.
1,398,708.
Patented Nov. 29, 1921.
2 SHEETS—SHEET 2.
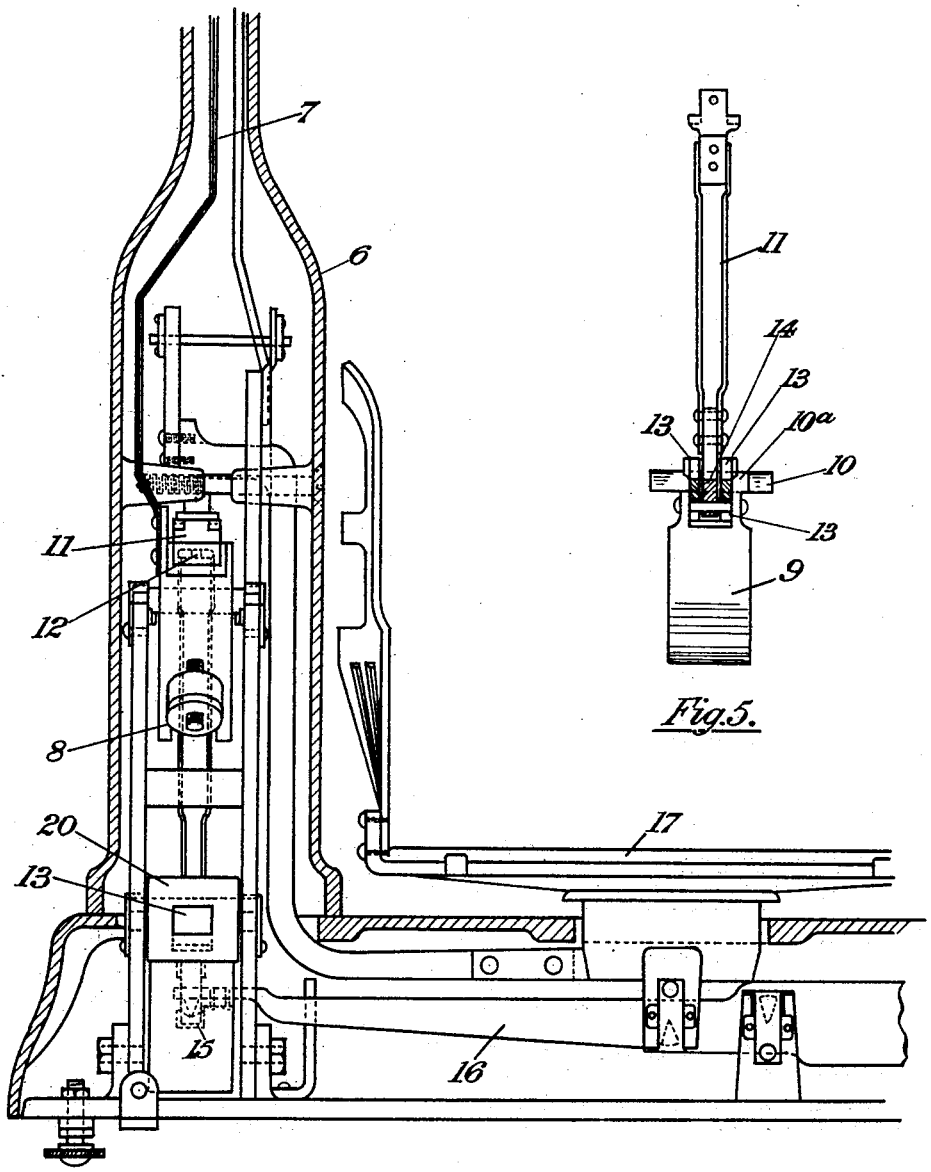

UNITED STATES PATENT OFFICE.

WILLIAM TIMSON, OF BIRMINGHAM, ENGLAND, ASSIGNOR TO W. & T. AVERY, LIMITED, OF BIRMINGHAM, ENGLAND.

WEIGHING-SCALE.

1,398,708.  Specification of Letters Patent.  Patented Nov. 29, 1921.

Application filed November 15, 1920. Serial No. 424,260.

*To all whom it may concern:*

Be it known that WILLIAM TIMSON, a subject of the King of Great Britain, residing at Soho Foundry, Birmingham, England, has invented a new and useful Improvement in Weighing-Scales; and he does hereby declare the following to be a full, clear, and exact description of the same.

This invention has reference to improvements in weighing scales more particularly to automatic or semi-automatic weighing scales of the kind wherein the weight is indicated on a graduated chart by means of an index pointer, the weight being determined by means of a pendulum, or a pendulum in connection with ordinary loose weights.

The object of the invention is to eliminate shock in the sensitive parts of the apparatus when a load is suddenly applied to or removed from the scale thereby enhancing the life and insuring the accuracy of the machine.

The invention comprises a weighing scale of the kind aforesaid wherein a two part lever is employed the two parts being normally connected by a connection which is automatically broken when a load is violently applied to the scale, said lever preferably being combined with means for preventing shock being transmitted to the indicating mechanism when the load is suddenly removed from the scale.

A scale constructed according to the present invention will now be described in conjunction with the accompanying drawings wherein similar reference numerals indicate similar parts in the several views.

Fig. 2 is a part sectional side elevation of the scale mechanism.

Fig. 5 is a part sectional end elevation on line 5—5 of Fig. 3.

Figures 1, 3, 4:
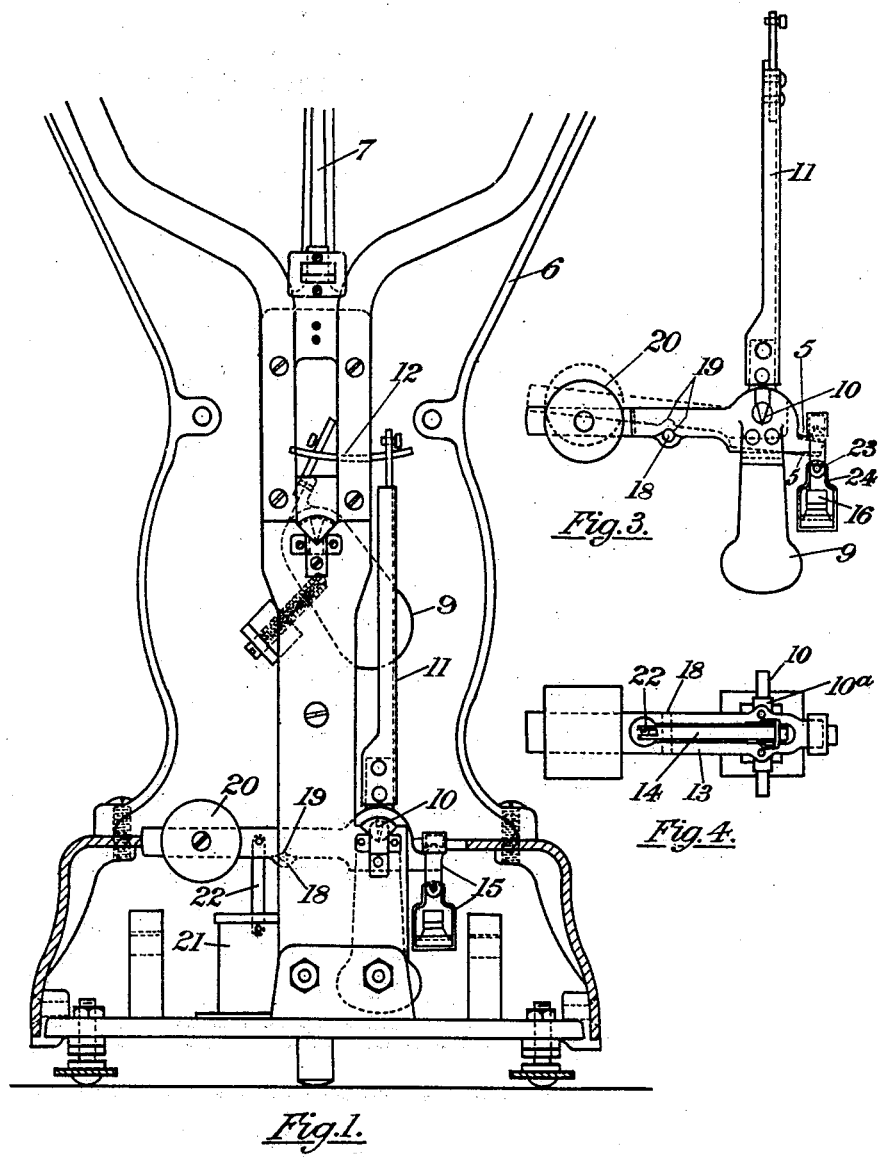
Fig. 1 is a front elevation of part of the scale mechanism with the front of the housing removed.
Fig. 3 is a detail view showing part of the mechanism seen in Fig. 1 to illustrate the particular feature of the present invention.
Fig. 4 is a plan of Fig. 3.

The scale mechanism is located within a housing 6 within which at the top is located in the ordinary manner a graduated chart (not shown) said chart indicating the weight by means of a pendulous index pointer 7 which is automatically controlled according to the load on the scale, the load being counterbalanced by means of pendulum weights 8 and 9 which are respectively connected to the said pointer 7 and to the inner part of a two part lever hereinafter fully described. The two part lever is fulcrumed on a knife-edge 10 below the pointer 7 and this lever is connected to the pointer by a vertical rod 11 and a stay connection 12, one part 13 (which will be termed the outer part) of the said two part lever is disposed on either side of the other or inner part 14. The inner part 14 of the two part lever is connected to the vertical rod 11 and the outer part 13 of the lever is coupled by means of the two part shackle 15 to the back end of the scale lever 16 on which the scale pan 17 is mounted in the usual manner. The two parts 13 and 14 of the said lever have their fulcrum 10 located in one horizontal alinement, that is, the knife-edge 10 forms the bearing support of the two part lever, the inner part 14 being adapted to rock on the central cylindrical section $10^a$ of the knife-edge pivot about the knife-edge 10. The connection between the two parts of the lever is by means of a pin 18 fixed to and projecting laterally on either side from the inner part 14, said pin being normally located within a recess or slot 19 in the outer part 13, as seen in Fig. 1 and in the full line position Fig. 3. This arrangement is such that if a load is violently applied to the scale pan 17 it is transmitted from the lever 16 to the two part shackle 15 and to the outer part 13 of the two part lever, this part 13 moves to its full extent as indicated by the dotted line position in Fig. 3, the resistance to movement being in the form of a weight 20 mounted on the outer part 13, but this movement of the part 13 of the lever is not communicated immediately to the inner part 14 which is connected to the indicating mechanism. The inner part 14 of the lever moves slowly to follow the outer part 13 under the action of the pendulous weight 9 which is mounted thereon and is steadied or retarded by a dashpot 21 to which the inner part is pivotally connected by means of the rod 22. It will be seen that by this means the slow following motion of the inner part 14 of the lever continues until the pin 18 again contacts with the recess 19 in the outer part 13 of the lever, an indication of the weight is then automatically completed without the least shock being transmitted to the indicating mechanism.

In order to prevent shock to the indicating mechanism by a violent removal of the load from the scale pan 17 the two part shackle 15 which connects the lever 16 to the outer part 13 of the aforesaid two part lever is broken in such a manner that if the load is violently removed from the scale pan the bottom part of the shackle moves rapidly upward and temporarily breaks its connection with the upper part of the shackle, or the shackle may be said to telescope to a certain degree, and a following through motion of the two part lever subsequently takes place under the control of the said pendulum weights 8 and 9 and this motion is retarded by the dashpot 21 connected to the inner part 14 of the two part lever. The temporary disconnection or telescoping of the two parts of the shackle 15 is very simply attained, the coupling being in the form of a cross pin 23 in the upper link of the shackle which engages the loop 24 of the bottom link of the shackle, whereby if the load is suddenly removed from the scale pan 17 the loop 24 of the bottom part of the shackle 15 is temporarily lifted from the cross pin 23, contact being subsequently re-established as hereinbefore stated by means of the pendulously controlled two part lever.

Claims:—

1. A pendulous weighing scale having in combination a two part compound lever, a scale pan connected to one part of said lever, a weight indicator connected to the other part of said lever, and linkage forming the aforesaid connection, the two parts of the said lever being adapted for independent co-operating motion when a load is violently applied to the scale pan.

2. In a pendulous weighing scale the combination of a two part compound lever mounted on a common fulcrum, a scale pan connected to the other part of said lever, and linkage forming the aforesaid connections, said two parts of the lever functioning as separate levers when a load is violently applied to or removed from the scale.

3. A pendulous weighing scale having in combination a two part compound lever, a scale pan connected to one part of said lever, a weight indicator, a dashpot, said weight indicator and dashpot being connected to the other part of said lever, the two parts of the said lever being mounted on a common fulcrum and normally operable as one element to function separately when a load is violently applied to or removed from the scale pan.

4. A pendulous weighing scale having in combination a two part compound lever mounted on a common fulcrum, a scale pan, a double shackle connecting said scale pan to one part of the compound lever, a weight indicator connected to the other part of said compound lever, the two parts of the said lever being adapted for independent co-operating motion when a load is violently applied to the scale pan, and said shackle telescoping in the event of the load being suddenly removed from the scale pan.

5. A pendulous weighing scale having in combination a two part lever consisting of outer and inner parts mounted on a common fulcrum, a scale pan connected to the outer part of said lever, a weight indicator connected to the inner part of said lever, a pendulous resistant mounted on the outer part of said lever, a dashpot pivotally connected to the inner part of said lever, a pin projecting from the inner part of said lever and adapted to engage the underside of the outer part of said lever to form a coupling between said inner and outer parts of the lever when functioning as one lever, the two parts of said lever being adapted for separate operation when a load is violently applied to the scale pan.

In testimony whereof, I have signed my name to this specification.

WILLIAM TIMSON.